Nov. 20, 1934.                R. C. JACOBS                1,981,702
                              GLARE SHIELD
                       Filed April 7, 1933    3 Sheets-Sheet 1

INVENTOR
REX C. JACOBS.

BY

ATTORNEYS

Nov. 20, 1934.  R. C. JACOBS  1,981,702
GLARE SHIELD
Filed April 7, 1933  3 Sheets-Sheet 2
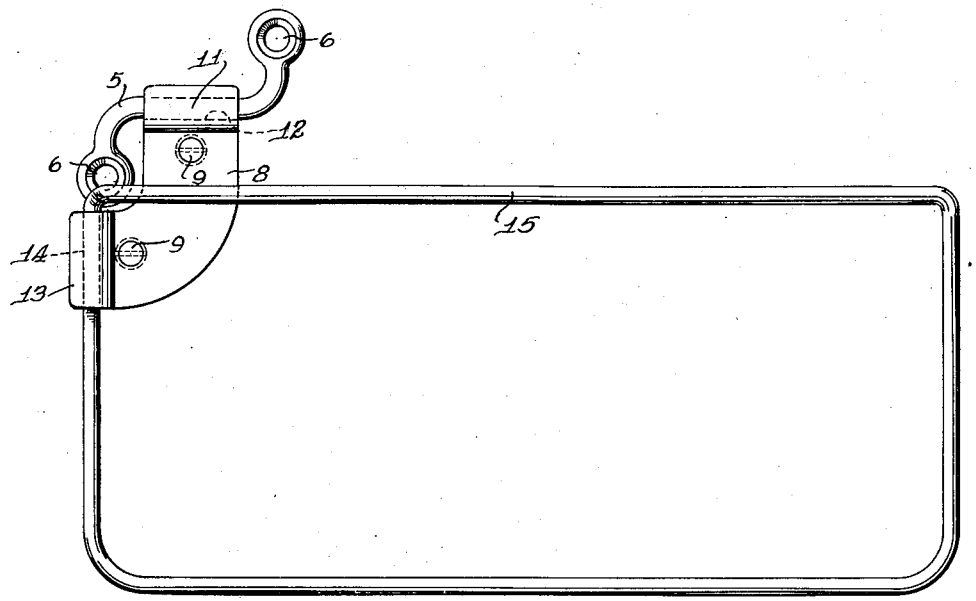
Fig.3.
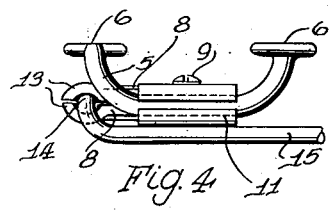
Fig.4.
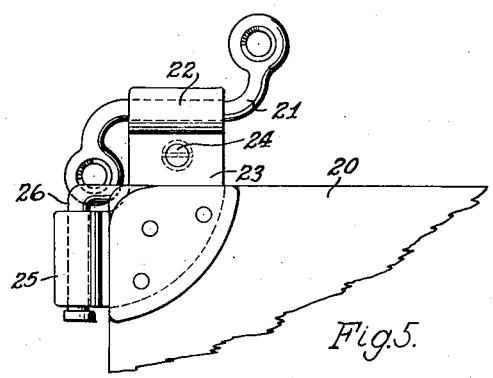
Fig.5.
Fig.6.
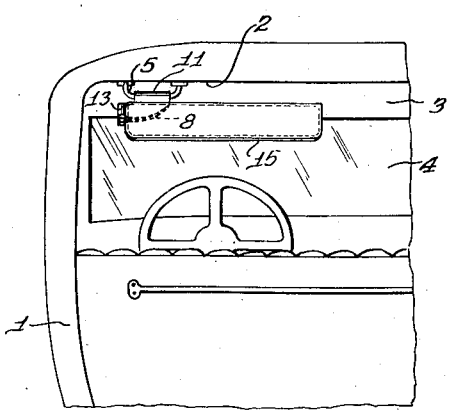
Fig.7.
INVENTOR
REX C. JACOBS
BY
ATTORNEYS Nov. 20, 1934.  R. C. JACOBS  1,981,702
GLARE SHIELD
Filed April 7, 1933   3 Sheets-Sheet 3

INVENTOR
REX C. JACOBS
BY
ATTORNEYS

Patented Nov. 20, 1934

1,981,702

UNITED STATES PATENT OFFICE 1,981,702

GLARE SHIELD

Rex C. Jacobs, Detroit, Mich.

Application April 7, 1933, Serial No. 664,918

4 Claims. (Cl. 296—97)

The present invention relates to a novel glare shield of a type particularly adapted for use in automobiles and like vehicles.

The primary object of the present invention is to provide a glare eliminator comprising a shield member and means for attaching the same within an automobile so that it may be easily moved to various positions to protect the eyes of the operator of an automobile or like vehicle or the eyes of passengers within the vehicle by intercepting glaring rays of light either from the sun as it nears the horizon or from the headlights on approaching and passing automobiles or like vehicles. The glare eliminator shield is provided with supporting means therefor which makes it capable of easy installation within a vehicle to occupy a minimum amount of space when not in use and capable of movement pivotally in different planes so that it can be moved to the various positions required to meet the varying conditions of glaring lights directed from different directions common to the operation of motor vehicles.

Another object of the present invention is to provide supporting means for an opaque board or plate of colored glass so that the same may be mounted within an automobile, the supporting means comprising plates having particular shape and design so that they correspond to form clamping fingers for engaging a supporting bracket and a marginal frame which is suitable for receiving either an opaque or colored glass shield. The clamping fingers are designed to permit pivotal movement of the plates relative to the supporting bracket and pivotal movement of the marginal frame relative to the plates by exerting sufficient manual pressure on the parts to overcome the frictional resistance set up by the engagement of the clamping fingers with the supporting bracket or marginal frame. The plates are shaped so that the clamping fingers that engage the supporting bracket extend at right angles to the clamping fingers that engage the marginal frame.

With the above and other ends in view the invention consists in matters hereinafter set forth and more particularly pointed out in the appended claims, reference being had to the accompanying drawings, in which Figure 1 is a perspective view of a fragment of an automobile having the present glare shield mounted therein;

Fig. 3 is an elevation of the supporting members and marginal frame that receives the shield;

Fig. 4 is a plan view projected from Fig. 3, the shield supporting frame being broken away;

Fig. 5 is a fragmentary view of a shield illustrating a modified support therefor;

Fig. 6 is a plan view projected from Fig. 5;

Fig. 7 illustrates the manner in which the present shield may be secured to the ceiling of an automobile;

Like characters of reference are employed throughout to designate corresponding parts.

Figure 1:
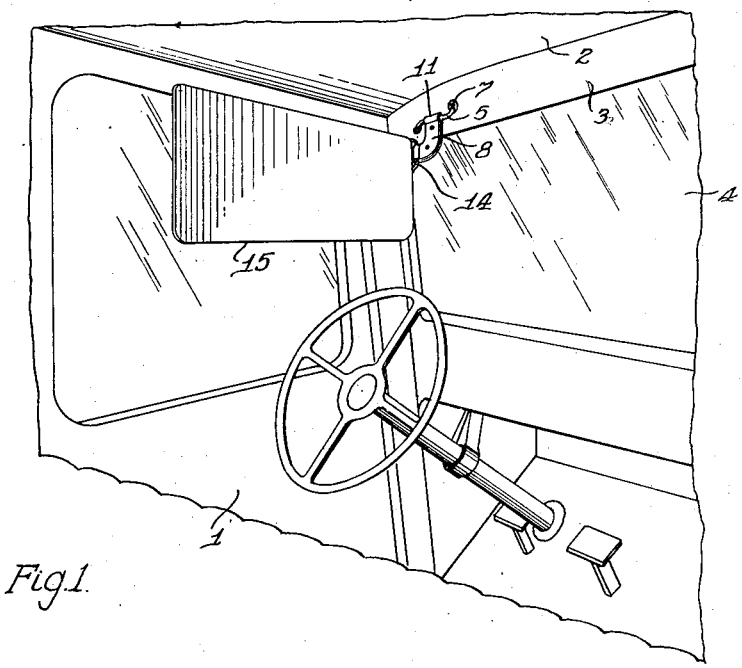

The numeral 1 designates an automobile having a ceiling 2 and a strip 3 located between the ceiling 2 and the windshield 4. A supporting bracket 5 is provided with loops 6 through which screws 7 may be passed to secure the bracket to the strip 3 as illustrated in Fig. 1, or to the ceiling 2 as illustrated in Fig. 7.

Figure 9:
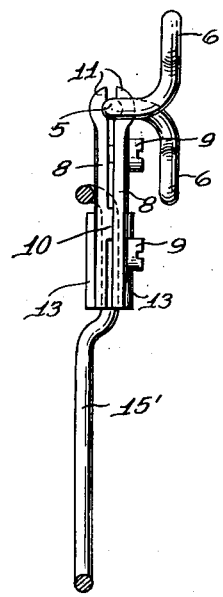
Fig. 9 is a cross section, taken on line 9—9 of Fig. 8.

A pair of curved plates 8 are secured together by screws 9, it being noted in Fig. 9 that one of the plates 8 has a projection 10 that serves as a spacer to maintain a certain amount of space between said plates. At one end the plates are bent to form fingers 11 that encircle the straight portion 12 of the bracket 5, the screw 9 adjacent that end of the plates serving as means for clamping the fingers 11 into tight engagement with the bracket 5.

On the opposite ends of the plates 8 are formed clamping fingers 13 that extend in a plane at right angles to the fingers 11. The clamping fingers 13 are held in tight engagement with an outwardly bent portion 14 of a frame member 15 by the screw 9 adjacent that end of the plates. The frame member 15 is of rectangular form and suitable for supporting either an opaque board, a fabric covering or a colored glass plate.

Figure 2:
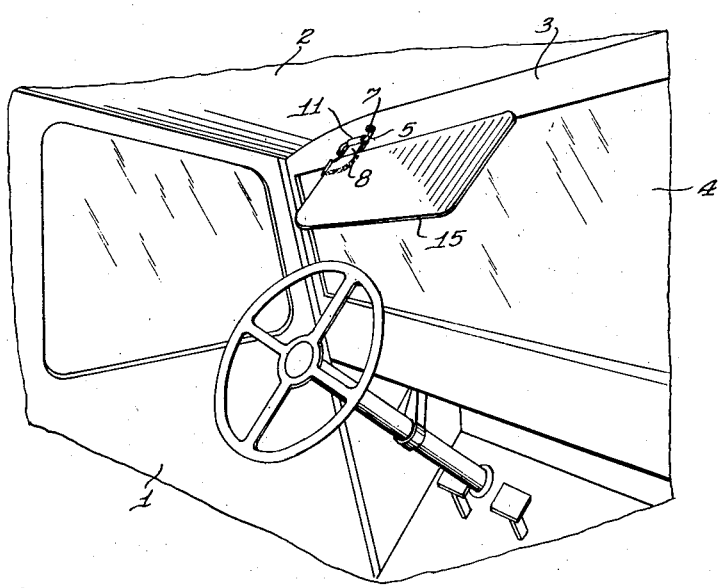
Fig. 2 is a view similar to Fig. 1 illustrating a different position of the shield.

As illustrated in Figs. 1, 2 and 7 the manner in which the clamping fingers 11 and 13 engage the supporting bracket 5 and the frame 15 makes possible movements that render the shield adaptable to various conditions. The plates 8 may be moved pivotally around a horizontal axis in the form of the straight portion 12 of the bracket and the frame may be moved pivotally in the fingers 13, the axis of the latter movement always being at right angles to the portion 12 of the bracket 5.

As illustrated in Figures 2 and 6 the top portion of the shield frame may be moved to rest on top of the plates 8 and when the latter are moved on their pivot so that they extend in a horizontal plane the weight of the frame is carried directly by the plates 8 and not by the clamping fingers 13. This feature removes the possibility of accidental pivotal movement of the shield when use of the same is not required. By tightening or loosening screws 9 adjustment may be made so that the required amount of pressure is exerted by fingers 11 and 13 to create sufficient friction to hold the parts in any desired position of adjustment.

It is to be understood that opaque material or colored glass may be secured in any suitable manner within the frame 15.

In the embodiment illustrated in Figs. 5 and 6 there is illustrated a shield 20 which may be a plate of colored glass or an opaque board. In this embodiment a bracket 21 is provided and is engaged by clamping fingers 22 on plates 23 that are secured together by screws 24. The plates are also provided with clamping fingers 25 extending at right angles to fingers 21, the fingers 25 engaging a projecting rod 26 that is attached to the shield 20.

Figure 8:
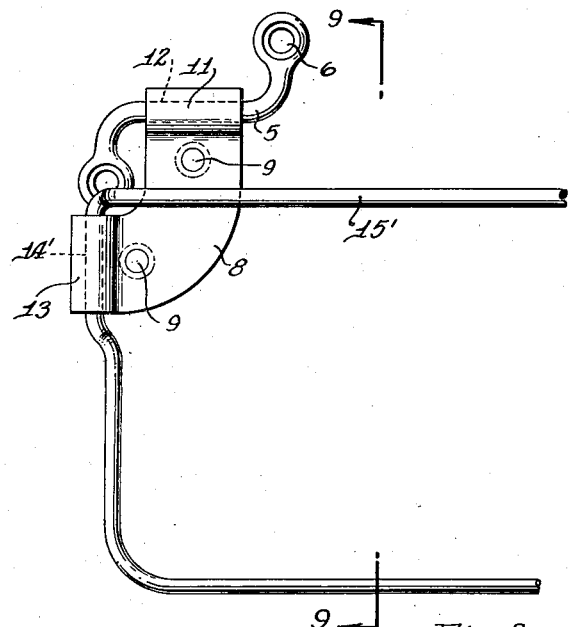
Fig. 8 is a fragmentary elevation of the present invention illustrating a different form of shield frame.

In Figs. 8 and 9 the same supporting members as described in reference to Figs. 3 and 4 are employed and the same reference numerals apply thereto. The modification takes place in the supporting frame 15' wherein the bent portion 14' thereof extends outwardly in two directions or at approximately forty-five degrees instead of only one direction or at right angles as in Figs. 3 and 4. The purpose of the particular off-set arrangement is to facilitate the operation of a sewing machine in securing opaque material to the frame 15' as well as moving the axis of pivotal movement of the frame 15' outwardly so that it may rest on top of plates 8 when the latter are in a horizontal position.

Figure 10:
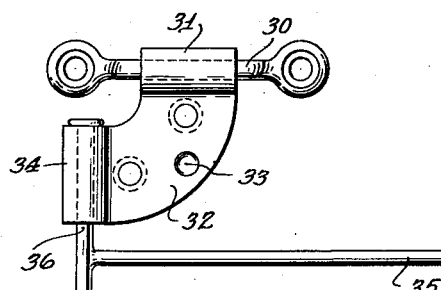
Fig. 10 illustrates in elevation a further modification of the shield frame.

A still further modification is illustrated in Fig. 10 wherein there is shown a supporting bracket 30 engaged by clamping fingers 31 on plates 32 that are secured together by screws 33. To provide a spacer between the plates 32 for the purpose described above one of the plates is stamped with an indentation 33. Clamping fingers 34 are formed on plates 32 and extend at right angles to the clamping fingers 31. A shield frame 35 is formed of rectangularly bent metal and has a projecting arm 36 engaged by clamping fingers 34.

Although specific embodiments of the present invention have been illustrated and described it is to be understood that various changes may be made in the details of construction without departing from the spirit of the invention as set forth in the appended claims, and such changes are contemplated.

What I claim is:

1. In combination, a fixed hinge pin, a hinge member connected at one end to said fixed pin for swinging thereon, a shield member comprising a stiff framework and an opaque material, a portion of said framework constituting a hinge pin for pivotal residence in the other end of said hinge member, said hinge member being laterally curved along its length whereby the hinges at its opposite ends reside at right angles to each other, the axes of the hinges of said hinge member lying in a single plane, said framework in the vicinity of that portion thereof used as a hinge pin being laterally offset to permit the adjacent portion of the shield to fold across said hinge member for compactness when the shield is not in use.

2. In combination, a fixed hinge pin, a hinge member connected at one end to said fixed pin for swinging thereon, and a shield member comprising a stiff closed framework having opaque material therearound, one side of said framework being exposed outwardly of said material for a portion of its length to constitute a hinge pin for pivotal residence in the other end of said hinge member, said hinge member being laterally curved along its length whereby the hinges at opposite ends thereof reside at right angles to each other, said shield being swingable about its own side with respect to said hinge member and swingable with said hinge member about said fixed pin, said shield when swung into operative position about its own side folding across said hinge member for compactness, the hinges at each end of said hinge member being contained in a single plane.

3. In combination, a shield member having a hinge pin integral therewith, a supporting bracket comprising two plate members having spaces therebetween, each of said plate members being curved at each end to form fingers constituting hinge members of substantial area, the hinge member at one end of said bracket being adapted to receive the hinge pin of said shield member, the hinge member at the other end of said bracket being adapted to receive a fixed hinge pin adapted to support said bracket and said shield, said bracket being transversely curved intermediate its length whereby the hinge at one end of said bracket is disposed at right angles to the hinge at the other end of said bracket, and adjustable means for urging said plates towards each other to vary the frictional engagement of said fingers with said hinge pins.

4. In combination in an automobile, a windshield, a horizontal hinge pin fixed above said windshield, a bracket hingedly connected at one end to said hinge pin for swinging through a vertical arc, a hinge member integral with the other end of said bracket at right angles to said fixed hinge pin, a shield having a hinge pin for reception by said hinge member, the axes of both of said hinge pins being contained in a common plane, said shield hinge pin being substantially vertical when said bracket resides in its lowermost position whereby said shield may be traversed through a horizontal arc about the last mentioned pin, said shield and said bracket together being swingable about said fixed pin to a position equal at least to the height of said fixed pin when starting from a position substantially parallel with said windshield.

REX C. JACOBS.